United States Patent [19]
McDaniel et al.

[11] Patent Number: 4,996,413
[45] Date of Patent: Feb. 26, 1991

[54] APPARATUS AND METHOD FOR READING DATA FROM AN IMAGE DETECTOR

[75] Inventors: David L. McDaniel, Dousman; Scott W. Petrick, New Berlin, both of Wis.

[73] Assignee: General Electric Company, Milwaukee, Wis.

[21] Appl. No.: 485,661

[22] Filed: Feb. 27, 1990

[51] Int. Cl.$^5$ .............................................. H01J 40/14
[52] U.S. Cl. .............................. 250/208.1; 358/213.29
[58] Field of Search ................. 250/208.1; 358/213.27, 358/213.29

[56] References Cited

U.S. PATENT DOCUMENTS

| | | | |
|---|---|---|---|
| 4,827,345 | 5/1989 | Nakagawa et al. | 358/213.29 |
| 4,837,630 | 6/1989 | Ueda | 358/213.29 |
| 4,851,917 | 7/1989 | Ohzu | 358/213.29 |

Primary Examiner—David C. Nelms
Assistant Examiner—Shami Khaled
Attorney, Agent, or Firm—Quarles & Brady

[57] ABSTRACT

A image detector includes an array of photodetectors arranged in n rows and m columns with at least a portion of the photodetectors in each column being selectively connected to a common column output signal line by a selector means. The image information is read out of the photodetectors by sequentially selecting groups of rows starting with a row near the middle of the array and then sequentially selecting other groups of rows on alternate sides of the array middle. As image data is read out of the photodetectors in the selected row group, groups of column outlet lines are coupled together to provide a combined output signal. This readout technique provides a reduction in the image data and reduces the likelihood of signal degradation for the central portion of the image.

19 Claims, 3 Drawing Sheets

APPARATUS AND METHOD FOR READING DATA FROM AN IMAGE DETECTOR

BACKGROUND OF THE INVENTION

The present invention relates to X-ray systems utilizing a solid state multiple element X-ray detector for producing an image; and more particularly, to techniques for reading the signals from the detector elements and processing the signals.

Conventional fluoroscopy equipment includes a source for projecting an X-ray beam through an object to be analyzed, such as a medical patient. After the beam passes through the patient, an image intensifier typically converted the X-ray radiation into a visible light image, and a video camera produced an analog video signal from the visible image for display on a monitor. Because an analog video signal was produced, much of the image processing for automatic brightness control and image enhancement was performed in the analog domain.

Recently, high resolution solid state X-ray detectors have been proposed, which comprise a two dimensional array of 3,000 to 4,000 photo diode detector elements in each dimension. Each element produces an electrical signal which corresponds to the brightness of a picture element in the X-ray image projected onto the detector. The signal from each detector element is read out individually and digitized for further image processing, storage and display.

The high resolution provided by such a large array of detector elements may be beneficial to the analysis of the patient in many certain circumstances. However, in situations where a high degree of resolution is not required, the processing of the incumbent large amount of data from the array significantly increases the image processing time above that which is reasonably required. Furthermore, certain X-ray systems may not require a detector with such a high degree of resolution in which case a smaller matrix detector would be satisfactory. However, in this instance it may be cost effective to still utilize the larger matrix detector, rather than develop a different size detector for each piece of X-ray equipment having a different resolution requirement. In both these cases when the detector produces a higher resolution image than is required, a technique for reducing the amount of data is desirable.

A problem inherent in conventional photo diode detector arrays is that the biasing charge placed on the photo diode may be partially discharged by transistor current leakage and by a mechanism commonly known as "dark current". The charge depletion due to the effects of dark current and current leakage produces an offset of the image signal. Since the amount of charge removed by these currents is not constant, the signal offset varies, adding a element of uncertainty to the detector output.

The amount of charge removed from the photo diode by these currents in part is a function of the length of time from photo diode biasing until detector element charge sensing. As a consequence, it is desirable to minimize the time required to read out the elements of the detector array in order to minimize the effect of these currents. This presents a trade-off in that it is also desirable to increase the readout time in order to reduce the bandwidth of the image signal processing circuit and reduce the electrical noise added to the detector signal by the circuit.

SUMMARY OF THE INVENTION

A solid state image sensor is formed by a two dimensional array of photodetectors arranged in m columns and n rows, where m and n are integers. For high resolution image sensing, the array can have approximately 4000 photodetectors in each column and row. The photodetectors in each column are connected to a common column output line by a separate switch means. The switch means for the photodetectors in each row are activated by a signal on a common row select line.

The image data sensed by each photodetector is read out by activating the row select lines in a given sequence. Initially, a group of one or more row select lines near the middle of the array are activated to apply signals from the associated photodetectors to the column output lines. Then a similar group of row select lines on one side of the middle are activated to couple signals from its associated photodetectors to the column output lines. Another similar group of one or more row select lines on the other side of the array middle is activated to apply signals from its corresponding photodetectors to the column output lines. In the preferred embodiment, signals from the remaining rows of photodetectors are readout by alternately activating row groups on opposite sides of the middle of the array.

When the groups consist of a plurality of rows the signals from photodetectors in several rows along each column are combined into the signal on the column output line. This produces a data reduction along one dimension of the array and of the image being sensed. In order to achieve symmetry in the data reduction to avoid image distortion, circuitry external to the image sensor combines the signals from a plurality of column output lines. Ideally the number of such output line signals to combine is chosen so that the image following data reduction has the same aspect ratio as the image prior to data reduction.

An object of the present invention is to provide a technique for reducing the amount of picture elements in an image.

Another object is to provide a method for reading image data from the central portion of the array and then progressively reading the image data outward from the array center. Such an outward scan reduces the deterioration of the central image portion due to effects that are a function of the elapsed time between image exposure and readout.

A further object is to provide a technique and apparatus for varying the degree of image data reduction depending upon the amount of image resolution required in the resultant image.

DETAILED DESCRIPTION OF THE INVENTION

Figure 1:
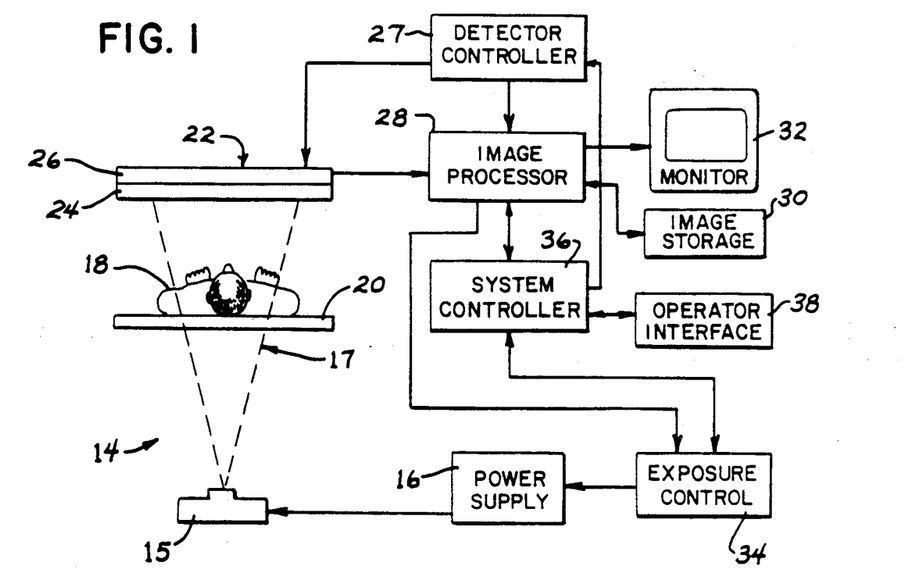
FIG. 1 is a block diagram of an X-ray fluoroscopy system utilizing the present invention.

With initial reference to FIG. 1, an X-ray apparatus 14 includes an X ray tube 15 which, when excited by a power supply 16, emits an X-ray beam 17. As illustrated, the X-ray beam is directed toward a patient 18 lying on an X-ray transmissive table 20. The portion of the beam which is transmitted through the table and the patient impinges upon an X-ray detector designated 22. The X-ray detector 22 comprises a scintillator 24 that converts the X-ray photons to lower energy photons in the visible spectrum. Contiguous with the scintillator 24 is a photodetector array 26, which converts the light photons into an electrical signal. A detector controller 27 contains electronics for operating the detector array to acquire an image and to read out the signal from each photodetector element.

The output signal from the photodetector array 26 is coupled to an image processor 28 that includes circuitry for processing and enhancing the X ray image signal. The processed image then is displayed on a video monitor 32 and may be archived in an image storage device 30. The image processor 28 additionally produces a brightness control signal which is applied to an exposure control circuit 34 to regulate the power supply 16 and thereby the X-ray exposure.

The overall operation of the X-ray apparatus 14 is governed by a system controller 36 which receives commands from the X-ray technician via an operator interface panel 38.

Figure 2:
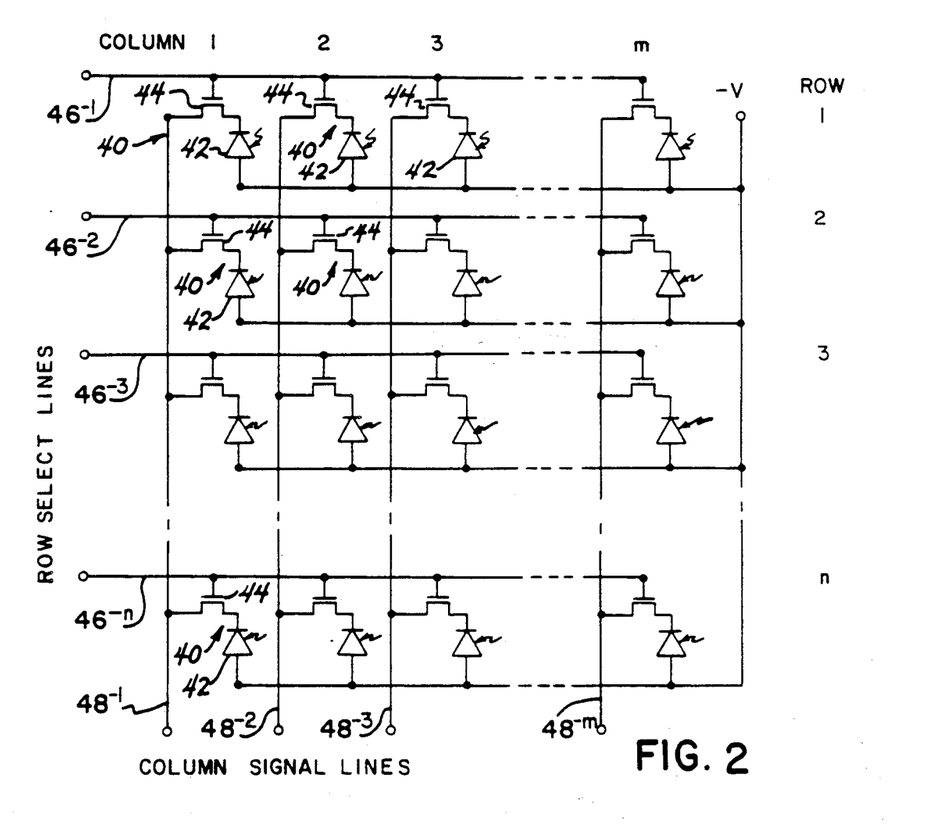
FIG. 2 is a schematic diagram of the image detector array in the system of FIG. 1.

FIG. 2 illustrates the circuitry of the photodetector array 26, which is formed by a matrix of detector elements 40. The detector elements 40 are arranged on an amorphous silicon wafer in a conventional two-dimensional array of m columns and n rows, where m and n are integers. For example, a typical high resolution X ray detector is a square array of 3,000 to 4,000 rows and columns of elements.

Each detector element 40 includes a photo diode 42 and a thin film transistor 44. The photo diodes 42 are fabricated from a large wafer area ensuring that the photo diode will intercept a sizeable portion of the light produced by the scintillator 24. Each photo diode 42 also has a relatively large capacitance that allows it to store the electrical charge resulting from the photon excitation.

The cathode of the photo diodes 42 in each column of the array is connected by the source-drain conduction path of the associated transistor 44 to a common column signal line ($48^{-1}$ through $48^{-m}$) for the column. For example the photo diodes 42 in column 1 are coupled to the first signal line $48^{-1}$. The anodes of the diodes in each row are connected in common to a source of a negative bias voltage ($-v$). The gate electrodes of the transistors 44 in each row are connected to a common row select line ($46^{-1}$ through $46^{-n}$,) such as line $46^{-1}$ for row 1. The row select lines and the column signal lines are coupled to the detector controller 27 and the column signal lines also are connected to the image processor 28.

In order to acquire an X ray image using the detector illustrated in FIG. 2, the apparatus 14 performs the following sequence of operations. Initially, the detector controller 27 connects all the column signal lines $48^{-1}$ through $48^{-m}$ to ground; and applies a positive voltage ($V_{on}$) to all the row select lines $46^{-1}$ through $46^{-n}$. The positive voltage applied to the row select lines turns on the transistor 44 in each detector element 40 placing a positive charge on the reverse biased photo diodes 42. Once the photo diodes have been fully charged, the detector controller 27 applies a negative voltage ($-V_{off}$), which is more negative than the negative supply voltage ($-V$), to the row select lines $46^{-1}$ through $46^{-n}$. This negative biasing of the row select lines turns off the transistor 44 in each detector element 40.

Then the detector 22 is exposed to a pulse of X-ray photons produced in a conventional manner by the system exciting tube 15 to generate a beam 17 of X-ray photons. The X-ray photons are converted to lower energy photons by the scintillator 24. When these lower energy photons strike the photo diodes 42 in the detector 26, the diodes conduct electricity and discharge a portion of their positive charge. The amount of the positive charge removed from a given photo diode 42 depends upon the amount of lower energy photons which strikes it, which in turn depends upon the intensity of the X-ray energy that strikes region of the scintillator 24 adjacent to the photo diode. Therefore, the amount of charge removed from the photo diode 42 in each detector element 40 is a function of the X-ray intensity striking the corresponding region of the X-ray detector 22.

After the termination of the X-ray exposure, the residual charge in each photo diode 42 is sensed. To do so, the column signal line $48^{-1}$ through $48^{-m}$ for each detector array column is simultaneously connected to separate sensing circuits in the image processor 28. Any of several types of sensing circuits can be incorporated into the image processor 28. For example, the sensing circuit can measure the voltage across the photo diode, and therefore the amount of charge remaining on the photo diode. Alternatively, the sensing circuit can connect the associated column signal line $48^{-1}$ through $48^{-m}$ to ground potential and measure the amount of charge that is required to replace the charge removed by the X ray exposure.

For maximum image resolution, the photo diode charges are sensed a row at a time by the detector controller 27 sequentially applying the positive voltage $V_{on}$ to each of the row select lines $46^{-1}$ through $46^{-n}$. When a row select line is positively biased, the detector array transistors 44 connected to that row select line are turned on thereby coupling the associated photo diodes 42 in the selected row to their column signal lines $48^{-1}$ through $48^{-m}$.

Figure 3:
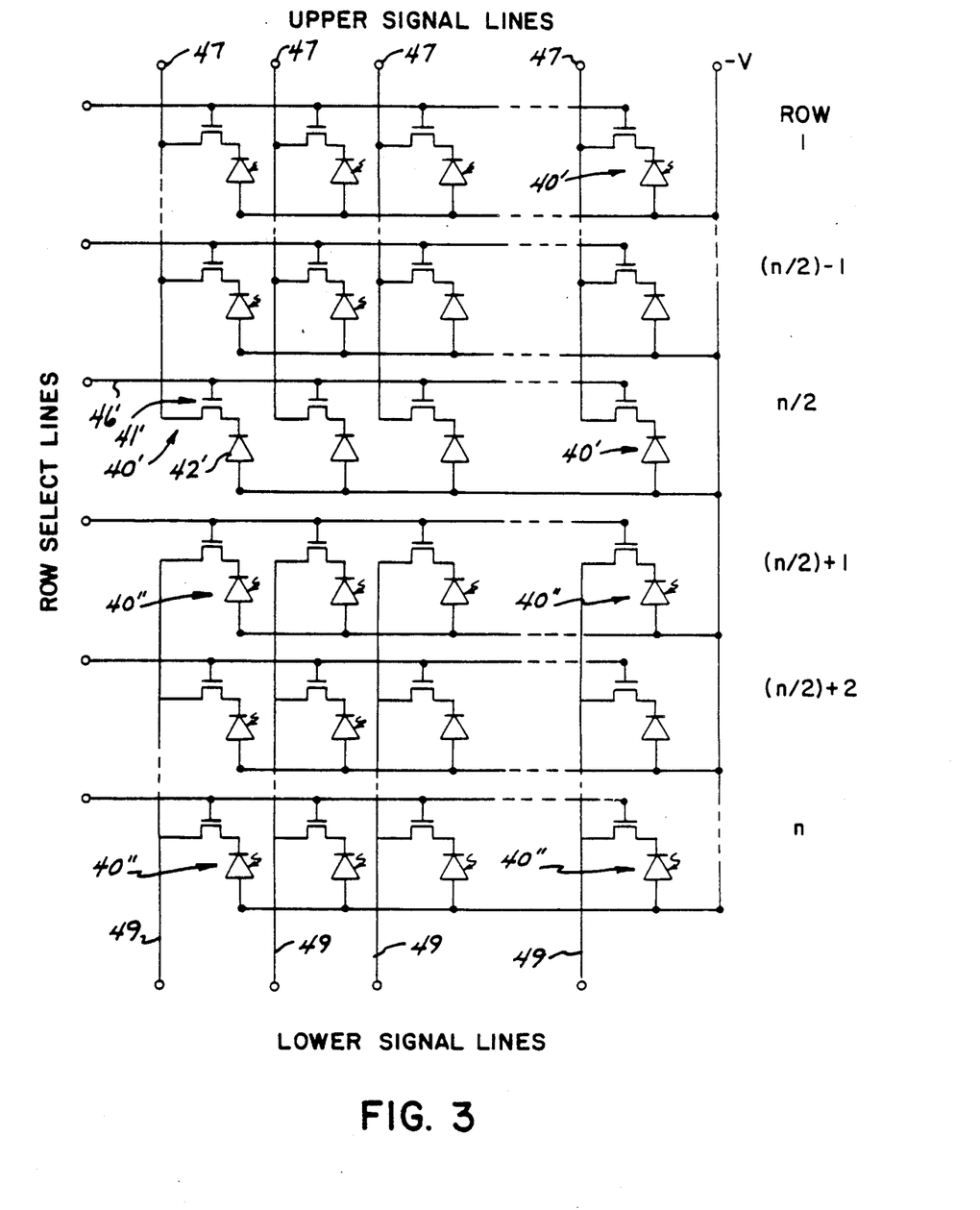
FIG. 3 is a schematic diagram of an alternative image detector array for the system of FIG. 1.

In order to decrease the amount of time required to read out the signal from each detector element in the array, the rows of detector elements can be divided into two groups, as illustrated in FIG. 3. In this example for a detector array 26 with n rows, the detector elements 40' in row 1 through row n/2 are connected to a first group of column signal lines 47. Similarly, the detector elements 40'' in row (n/2)+1 through row n are connected to a second group of column signal lines 49. In this example, the detector elements 40' in the top half of the array can be read out simultaneously with the detector elements 40'' in the bottom half in the array. It should be noted that this alternative embodiment of the detector array 26 requires twice the number of signal sensing circuits. However, the time required to sense the charge in the detector elements is decreased by a factor of two; or alternatively, the sensing time can be the same as with the previous embodiment allowing the bandwidth of the sensing circuits to be reduced. In addition, the subdivision of the detector array reduces the electrical noise and capacitance seen by the sensing circuits.

As noted above, in applications where the full resolution of the detector array 26 is not required, it is advantageous to reduce the amount of image data. With the X-ray detector 22, the detector elements can be combined along the rows and the columns in order to reduce the number of picture elements. With a two-dimensional image, the data reduction must occur equally in both dimensions in order to avoid distorting the resultant image. To produce a variety of fields of view, image matrix sizes and image acquisition rates, the present system is able to subdivide the image into two-dimensional groups of q by p detector elements where p and q are an integers. The q by p groups have the same aspect ratio as the entire array. For the exemplary square array p and q are equal, having a common value in the range from 1 to 4 for example. This results in subdivision groups having 1, 4, 9 or 16 detector elements.

In a variation of the present concept, the detector array does not comprise a square matrix of detector elements. For example, there may be more columns of detector elements than rows in the array, such as in imagers for an NTSC standard video camera. Although a non-square detector array is used, the image processing may require a square array of image data. In such a case, the signals from the detector elements in the extra columns either are not used or are combined into a square matrix of image elements. When this is done, the non-square detector array becomes equivalent to a square one insofar as the present concept is concerned. With this variation, the variables m and n may not represent the number of columns and rows of detector elements in the actual detector array but rather m and n correspond to the number of columns and rows in the equivalent square array.

Referring again to FIG. 2, the charge signals from adjacent detector elements 40 can easily be combined along a column by simultaneously applying the positive voltage $V_{on}$ to a group of row select lines $46^{-1}$ through $46^{-n}$. In this case, if the sensing circuits measure the voltage from the photo diodes 42 on the column signal lines $48^{-1}$ through $48^{-m}$, the output of each sensing circuit will correspond to the average of the signals from the selected group of detector elements in the corresponding array column. On the other hand, if the sensor circuits measure the current required to replace the charge removed from the photo diodes 42, the output of each sensing circuit will correspond to the sum of the signals from the selected group of detector elements in the column.

Figure 4:
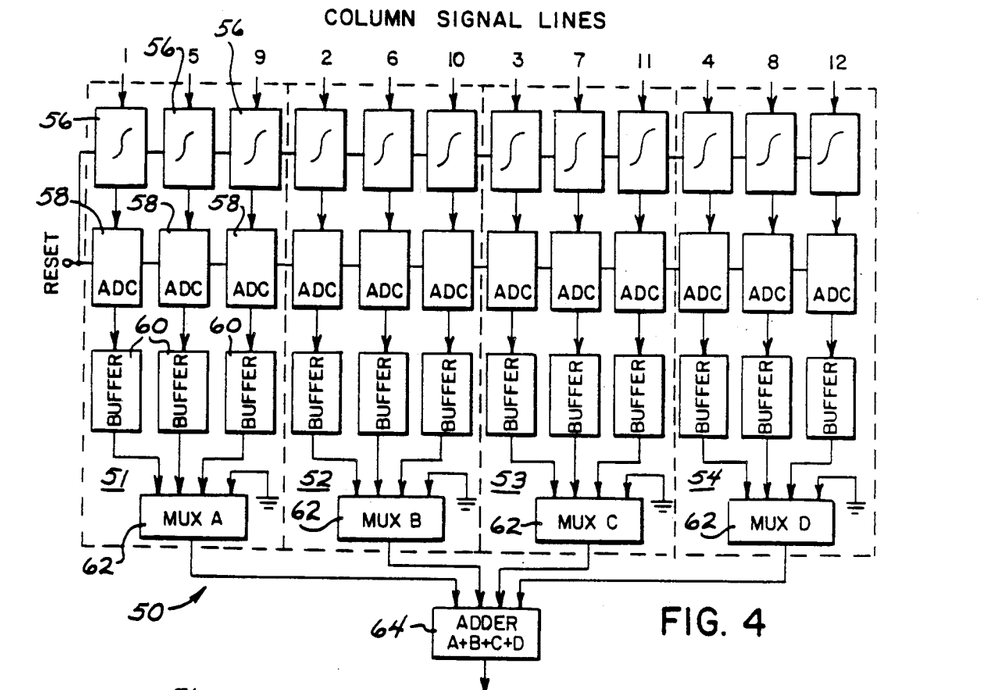
FIG. 4 illustrates a digital data reduction circuit for processing the picture elements from the detector array.

While signals from the detector elements 40 in several rows can be combined by simultaneously selecting several rows in the array, combining the signals from detector elements in adjacent columns (i.e. along the other dimension of the array) must be accomplished by external circuitry. With reference to FIG. 4, a sensing circuit 50 is incorporated into the image processor 28 to combine the signals from multiple columns. This circuit 50 allows detector elements to be sensed individually or combined into 2, 3 or 4 columns. The portion of the sensing circuit 50 for the first twelve columns of detector elements 40 is illustrated in FIG. 4. Replicas of this circuit portion are provided for each group of twelve adjacent array columns.

The sensing circuit comprises a series of modules 51, 52, 53 and 54, with each module processing the output signals from three columns of the array. The first module 51 is coupled to the column signal lines $48^{-1}$, $48^{-5}$ and $48^{-9}$ for columns 1, 5, and 9 of the detector array 26; and module 52 is coupled to the column signal lines $48^{-2}$, $48^{-6}$ and $48^{-10}$ for columns 2, 6 and 10. Similarly, the third module 53 receives the detector array column signal lines $48^{-3}$, $48^{-7}$ and $48^{-11}$ for columns 3, 7 and 11; and the fourth illustrated module 54 is coupled to column signal lines $48^{-4}$, $48^{-8}$ and $48^{-12}$ for columns 4, 8 and 12 of the detector array.

The internal circuitry of each module 51-54 is identical and the circuitry for the first module 51 shall be described in detail. The column signal lines $48^{-1}$, $48^{-9}$ and $48^{-5}$ for columns 1, 5 and 9 are each coupled to the input of a separate integrator 56. The output from each integrator 56 is connected to a sample and hold circuit in an analog to digital converter (ADC) 58, which samples the output of the integrator and converts the output into a digital form. The separate digitized outputs are stored in three sets of data buffers 60. The digital output from each set of data buffers 60 in the module 51 are connected to separate inputs of a four-to-one multiplexer 62 (MUX A). The data lines for the fourth input to multiplexer 62 are all coupled to ground potential to provide an input representing the number zero.

The multiplexers 62 for each of the four illustrated modules 51, 52, 53 and 54 are designated as MUX A, MUX B, MUX C and MUX D, respectively. The outputs from the four multiplexers 62 in modules 51-54 are coupled to inputs of an adder circuit 64 to produce the sum of the multiplexer outputs, as indicated by the arithmetic expression $A+B+C+D$ within the adder block. Therefore, the output from the adder circuit 64 represents the summation of the signals from each of the module multiplexers 62; and the combination of the image signals from a group of detector array columns.

Although not illustrated in FIG. 4, the multiplexers 62 in the sensing circuit 50 receive control signals from the detector controller 27 directing each multiplexer to couple one of the input lines to its output line. Depending upon the control signal applied to the four multiplexers A, B, C and D in each in a group of four modules 51-54, the output signals from 1, 2, 3 or 4 columns of detector elements 40 can be combined into the output from the adder 64 for that group of modules.

To select a single column, the associated multiplexer 62 is directed to couple the corresponding input line to its output line and each of the other multiplexers for the group of four modules 51-54 is directed to couple the grounded fourth input to their respective output lines. This action produces a summation in adder 64 of the selected column signal with zero signals from the other multiplexers 62. For example to select only the second column, multiplexer B is directed to couple its first input to its output and multiplexers A, C and D are directed to couple their fourth inputs to their outputs. Thereafter, a different set of directions can be sent to the multiplexer 62 to sequentially access the signals from each of the other column signal lines from the detector array. Since each column is being addressed individually by the technique, no reduction of the image data occurs.

To achieve the maximum amount of data reduction available from this circuit, the image data on four signal lines of the detector array 26 are combined by sensing circuit 50. For example, when the signals for columns 1-4 are to be combined, the four multiplexers 62 are all directed to couple their first input to their outputs. This action applies the signals from column signal lines 1, 2, 3 and 4 to the inputs of adder 64 where they are summed and sent to the adder's output. Then, sequentially, each adjacent group of four columns of the detector array 26 can be processed by changing the directions sent to the multiplexers so that the signals from other module buffers 60 are sequentially combined by the adder 64.

From the above description, one skilled in the art can easily understand how to utilize the sensing circuit 50 and direct the multiplexers 62 to produce a data reduction by combining detector elements in pairs or trios of adjacent array columns.

The circuit disclosed in FIG. 4 employs a separate analog-to-digital converter 58 for each column signal line $48^{-1}$ through $48^{-m}$ from the detector array 26. This has the advantage of enabling the use of converters with relatively slow digitization rates, but requires a relatively large number of converters. As an alternative, the data may be combined before digitizing, thus reducing the number of analog to digital converters. However, in this alternative, faster converters will have to be utilized, and the potential for the introduction of electronic noise in the analog combining circuitry is increased.

Figure 5:
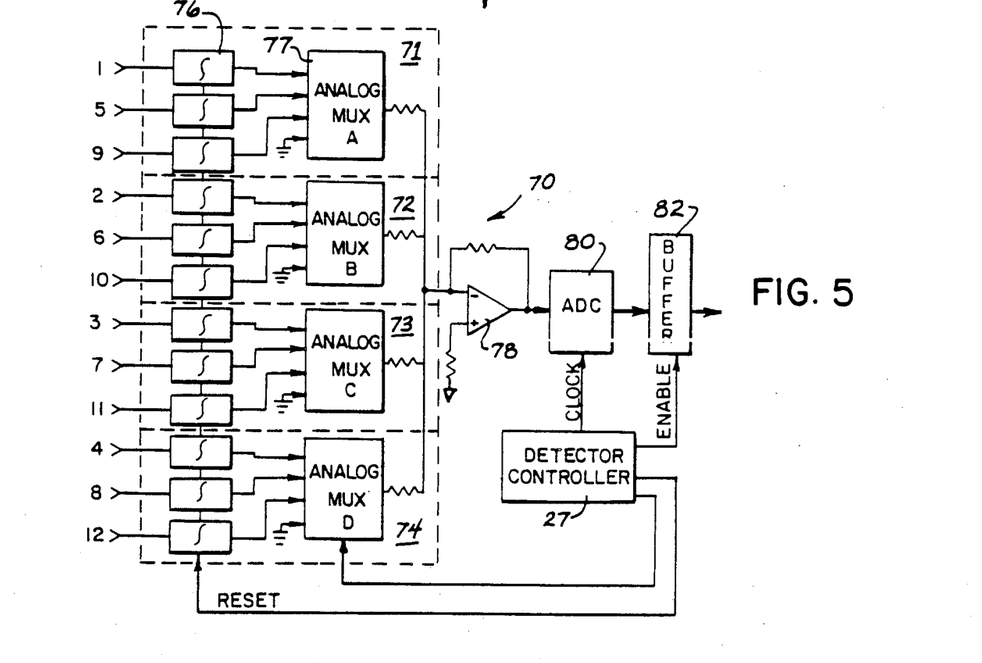
FIG. 5 is an alternative analog data reduction circuit.

An example of such a alternative sensing circuit 70 is shown in FIG. 5. As with the original embodiment of a sensing circuit 50 in FIG. 4, the alternative circuit 70 is illustrated for twelve columns of the detector array with the understanding that replicas of this circuit portion are provided for each group of twelve adjacent array columns. This portion of the signal sensing circuit 70 is formed by four modules 71, 72, 73 and 74 as denoted by the dashed lines in the drawing. Each module 72-74 receives three of the column signal lines which are coupled to separate integrators 76. The output from the three integrators 76 within a module are coupled to separate inputs of an analog four-to-one multiplexer 77. The fourth input of the analog multiplexer 77 is coupled to ground potential to provide a zero potential input. Each multiplexer 77 can set its output to any of the three input signals from the detector array or to the grounded input. The outputs from the four module multiplexers MUX A, MUX B, MUX C and MUX D then are combined in a summing amplifier 78. The summation of the signals from the four modules 71-74 is digitized by an analog-to-digital converter (ADC) 80, and the result is stored in a digital buffer 82. FIG. 5 also shows the detector controller 27, which provides control signals to the sensing circuit 70 as illustrated.

The multiplexers 77 within each module 71-74 are directed in a similar manner to that described with respect to the operation of sensing circuit 50 in FIG. 4, to individually access each column signal line or combine pairs, trios, or quartets of column signal lines in order to achieve the desired degree of data reduction.

When the X-ray system is aligned with the patient the area of the patient's body which is of primary interest typically is placed at the center of the X-ray system's field of view. Therefore, the central picture elements of the X-ray image will be of primary importance to the medical personnel using the system. To ensure the best image quality of the center of the image, the present invention minimizes the time which elapses from precharging the photo diodes until the rows of picture elements at the center of the detector array 26 are scanned for charge readout. This is accomplished by sensing the central rows first and sequentially selecting rows on alternate sides of the center which are progressively farther and farther from the center of the array. This minimizes the elapsed time for the central image elements. The tables in the Appendix contain the sequence in which the detector element rows are selected for each of the two embodiments of the detector array illustrated in FIGS. 2 and 3 and for different degrees of data reduction.

With respect to the photodetector array illustrated in FIG. 2, for example, Table I illustrates the sequence in which the detector controller 27 activates each of the row select lines $46^{-1}$ through $46^{-n}$ to read out the charge on individual photo diodes 42. As illustrated in the table during the first readout period, the detector controller 27 applies the positive voltage ($V_{on}$) to the row select line designated n/2, at the center of the detector array. This enables the charge in each of the photo diodes of this central row to be read out on their corresponding column signal line $48^{-1}$ through $48^{-m}$. Since no data reduction is occurring in this example, only one row at a time is selected by the detector controller 27. After sufficient time has elapsed for the sensing circuits in the image processor 28 to measure the remaining charge on each of the diodes, the detector controller 27 applies the negative voltage minus $V_{off}$ to the central row select line n/2.

Then the detector controller selects one of the row select lines which is immediately adjacent to the central one, which is designated row $(n/2)+1$, by applying a positive voltage $V_{on}$ to the next row select line. Once the charges in the photo diodes for that row have been sensed, the detector controller applies the $-V_{off}$ voltage to the $(n/2)+1$ row select line. Then, the detector controller 27 chooses the row select line on the other side of the central row, which line is designated as $(n/2)-1$, and in a similar manner, energizes that line to sense the charges on the row's photo diodes.

As seen in Table I the next two rows selected designated $(n/2)+2$ and $(n/2)-2$ are two rows removed from the center of the array. This sequence of row selection continues until finally the first and last rows have been selected for charge sensing.

When the data reduction technique is to be applied during the readout of the photodetector charges, a plurality of row select lines are turned on simultaneously depending upon the degree of data reduction desired.

As shown in Table II, the data is reduced by selecting two rows of the detector array 26 during each readout period. During the first readout period, the detector controller 27 chooses the central row (n/2) and one of the adjacent rows $(n/2)-1$ of the detector array 26. Since when two rows are selected, two photo diodes in each column of the array will have their charges applied to the corresponding signal lines 48 so that the signal on each of these lines 48 represents the charge in two photodetector sites 42. As each pair of rows is being read out, the sensing circuit in FIG. 4 is operated to combine the signals from pairs of adjacent columns of the detector array 26 as previously described. These combined signals are further processed for display on monitor 32 and storage in device 30 (see FIG. 1).

At the completion of the first readout period of the data reduction technique illustrated in Table II, another pair of adjacent rows on one side of the middle of the photodetector array 26 are selected and their charges similarly read out in a combined manner. In the third readout period, the next adjacent pair of rows on the opposite of the middle of the photodetector array 26 are chosen by the detector controller 27 activating their row select lines. The readout process continues with the detector controller 27 selecting adjacent pairs of photodetector array rows alternating on either side of the middle of the array and moving farther and farther away from the middle. Eventually, the first and second rows will be chosen and their charges read out, followed by the ultimate and penultimate rows in the final readout period. As illustrated by the comparison of Tables I and II, the data reduction technique in the latter example, in which pairs of rows are read out simultaneously, has half the number of readout period as in the Table I example in which each photodetector array site is read out individually.

Similar data reduction techniques occur in the examples depicted in Tables III and IV. Table III relates to a readout scheme in which the data is reduced through the simultaneous readout of trios of rows and similarly combining trios of columns in the sensing circuit 50 illustrated in FIG. 4. The data may be reduced even more by the technique depicted in FIG. 4 in which quartets of rows are simultaneously read out by simultaneously activating four row select lines 46 during each readout period.

Tables V through VIII depict the readout techniques utilized with the photodetector array illustrated in FIG. 3 where each column of photodetector elements 40 is divided in half with the upper group of photo elements being connected to a separate column signal line from the lower group of detector elements. With this photodetector array structure, when the detector elements are to be read out individually, a row in the upper half and a row in the lower half of the array is read simultaneously. As depicted in Table V during the first readout period, the two rows $(n/2)$ and $(n/2)+1$ at the center of the array are selected by the detector controller 27. During the next readout period, the next adjacent rows $(n/2)-1$ and $(n/2)+2$ on either side of the array center are selected. The selection continues until the first and last rows are selected during the final readout period.

When the data read out of the detector array in FIG. 3 is to be reduced, two rows in both the top and bottom sections of the array can be read during each readout period. The row readout for this data reduction technique is illustrated in Table VI. Similarly, when the data in this detector array is to be reduced further, three rows in both the upper and lower sections of the detector array 26 are simultaneously read by the detector controller 27 activating six row select lines during each readout period as depicted in Table VII. Table VIII provides the readout scheme when the data from the detector array in FIG. 3 is to be reduced even further. In this case, eight rows are activated simultaneously by the detector controller 27 with four of those rows being in the upper half and the other four in the lower half of the detector array 26.

APPENDIX OF TABLES

TABLE I

Row selection sequence to sense individual X-ray detector elements in the embodiment in FIG. 2.

| Readout Period | Row Selected |
|---|---|
| 1 | $(n/2)$ |
| 2 | $(n/2) + 1$ |
| 3 | $(n/2) - 1$ |
| 4 | $(n/2) + 2$ |
| 5 | $(n/2) - 2$ |
| . | . |
| . | . |
| . | . |
| n-1 | 1 |
| n | n |

TABLE II

Row selection sequence to sense X-ray detector elements grouped by pairs of rows in the embodiment in FIG. 2.

| Readout Period | Rows Selected |
|---|---|
| 1 | $(n/2)$ and $(n/2) - 1$ |
| 2 | $(n/2) + 1$ and $(n/2) + 2$ |
| 3 | $(n/2) - 2$ and $(n/2) - 3$ |
| 4 | $(n/2) + 3$ and $(n/2) + 4$ |
| . | . |
| . | . |
| $(n/2) - 1$ | 2 and 1 |
| $(n/2)$ | $n - 1$ and n |

TABLE III

Row selection sequence to sense X-ray detector elements grouped by Trios of rows in the embodiment in FIG. 2.

| Readout Period | Rows Selected |
|---|---|
| 1 | $(n/2)$, $(n/2 - 1$ and $(n/2) - 2$ |
| 2 | $(n/2) + 1$, $(n/2) + 2$ and $(n/2) + 3$ |
| 3 | $(n/2) - 3$, $(n/2) - 4$ and $(n/2) - 5$ |
| 4 | $(n/2) + 4$, $(n/2) + 5$ and $(n/2) + 6$ |
| . | . |
| . | . |
| $(n/3) - 1$ | 3, 2 and 1 |
| $(n/3)$ | $n - 2, n - 1$ and n |

TABLE IV

Row selection sequence to sense X-ray detector elements grouped by quartets of rows in the embodiment in FIG. 2.

| Readout Period | Rows Selected |
|---|---|
| 1 | $(n/2)$, $(n/2) - 1$, $(n/2) - 2$ and $(n/2) - 3$ |
| 2 | $(n/2) + 1$, $(n/2) + 2$, $(n/2) + 3$ and $(n/2) + 4$ |
| 3 | $(n/2) - 4$, $(n/2) - 5$, $(n/2) - 6$ and $(n/2) - 7$ |
| 4 | $(n/2) + 5$, $(n/2) + 6$, $(n/2) + 7$ and $(n/2) + 8$ |
| . | . |
| . | . |
| $(n/4) - 1$ | 4, 3, 2 and 1 |
| $(n/4)$ | $n - 3, n - 2, n - 1$ and n |

TABLE VI

Row selection sequence to sense X-ray detector elements individually in the embodiment in FIG. 3.

| Readout Period | Rows Selected |
|---|---|
| 1 | $(n/2)$ and $(n/2) + 1$ |
| 2 | $(n/2) - 1$ and $(n/2) + 2$ |
| 3 | $(n/2) - 2$ and $(n/2) + 3$ |
| 4 | $(n/2) - 3$ and $(n/2) + 4$ |
| . | . |
| . | . |
| $(n/2) - 1$ | 2 and $n - 1$ |
| $(n/2)$ | 1 and n |

TABLE VI

Row selection sequence to sense X-ray detector elements grouped by pairs of rows in the embodiment in FIG. 3.

| Readout Period | Rows Selected |
|---|---|
| 1 | (n/2), (n/2) − 1, (n/2) + 1 and (n/2) + 2 |
| 2 | (n/2) − 2, (n/2) − 3, (n/2) + 3 and (n/2) + 4 |
| 3 | (n/2) − 4, (n/2) − 5, (n/2) + 5 and (n/2) + 6 |
| 4 | (n/2) − 6, (n/2) − 7, (n/2) + 7 and (n/2) + 8 |
| . | . |
| . | . |
| . | . |
| (n/4) − 1 | 4, 3, n − 3 and n − 2 |
| (n/4) | 2, 1, n − 1 and n |

TABLE VII

Row selection sequence to sense X-ray detector elements grouped by trios of rows in the embodiment in FIG. 3.

| Readout Period | Rows Selected |
|---|---|
| 1 | (n/2), (n/2) − 1, (n/2) − 2, (n/2) + 1, (n/2) + 2 and (n/2) + 3 |
| 2 | (n/2) − 3, (n/2) − 4, (n/2) − 5, (n/2) + 4, (n/2) + 5 and (n/2) + 6 |
| 3 | (n/2) − 6, (n/2) − 7, (n/2) − 8, (n/2) + 7, (n/2) + 8 and (n/2) + 9 |
| 4 | (n/2) − 9, (n/2) − 10, (n/2) − 11, (n/2) + 10, (n/2) + 11 and (n/2) + 12 |
| . | . |
| . | . |
| . | . |
| (n/6) − 1 | 6, 5, 4, n − 5, n − 4 and n − 3 |
| (n/6) | 3, 2, 1, n − 2, n − 1 and n |

TABLE VIII

Row selection sequence to sense X-ray detector elements grouped by quartets of rows in the embodiment in FIG. 3. Each line of this table represents a different readout period.

Row Selection for n/8 Readout Periods (n/2), (n/2) − 1, (n/2) − 2, (n/2) − 3, (n/2) + 1, (n/2) + 2, (n/2) + 3 and (n/2) + 4
(n/2) − 4, (n/2) − 5, (n/2) − 6, (n/2) − 7, (n/2) + 5, (n/2) + 6, (n/2) + 7 and (n/2) + 8
.
.
.
8, 7, 6, 5, n − 7, n − 6 n − 5 and n − 4
4, 3, 2, 1, n − 3, n − 2, n − 1 and n

We claim:

1. A method for reading image data from an array of photodetectors arranged in rows and columns comprising:
   (a) sensing signals from the photodetectors in at least one row substantially at the center of the array;
   (b) sensing signals from the photodetectors in at least one row on one side of a row from which signals were sensed during step a;
   (c) sensing signals from the photodetectors in at least one row on the other side of a row from which signals were sensed during step a; and
   (d) repeating steps b and c until signals from all of the rows of photodetectors have been sensed.

2. The method as recited in claim 1 wherein the signals from a single row of photodetectors are sensed during steps a, b and c; and each row from which signals are sensed during steps b and c is adjacent a row of photodetectors sensed previously.

3. The method as recited in claim 1 wherein the signals from the photodetectors in a first plurality of rows are simultaneously sensed during steps a, b and c with the plurality of rows being adjacent each other.

4. The method as recited in claim 3 wherein each first plurality of rows from which signals are sensed during steps b and c is adjacent a row of photodetectors from which signals were sensed previously.

5. The method as recited in claim 3 further comprising combining the signals sensed from the photodetectors in a second plurality of adjacent columns whenever the signals from the photodetectors are being sensed.

6. The method as recited in claim 5 wherein the ratio of the first plurality to the second plurality is substantially the same as the ratio of the number of rows to the number of columns in the array.

7. The method as recited in claim 1 wherein steps b and c are executed simultaneously.

8. A method for reading image data from a detector array having individual photodetectors arranged in n rows and m columns, where m and n are integers, with at least a portion of the photodetectors in each column being connected by a switch means to a common column output line, said method comprising the steps of:
   (a) applying signals from the photodetectors in an initial group of rows at the center of the detector array to the column output lines;
   (b) applying signals from the photodetectors in a group of rows on one side of the initial group of rows to the column output lines;
   (c) applying signals from the photodetectors in a group of rows on the other side of the initial group of rows to the column output lines; and
   (d) repeating steps b and c until signal from all of the rows of photodetector have been applied to the column output lines.

9. The method as recited in claim 8 wherein the groups of rows of photodetectors, from which signals are applied in steps b and c, are adjacent to a group from which signals were applied previously.

10. The method as recited in claim 8 further comprising combining the signals from groups of q column output lines into m/q combined output signals.

11. The method as recited in claim 8 wherein each group consists of p rows of photodetectors, where p is an integer; and further comprising combining the signals from groups of p column output lines into m/p combined output signals.

12. A method for reading image data from an array of photodetectors arranged in n rows and m columns with at least a portion of the photodetectors in each column being connected by a selector means to a separate output line for that column, said method comprising the steps of:
  (a) activating given selector means to apply signals from the photodetectors in a group of p rows simultaneously to the output lines;
  (b) producing a plurality of combined output signals, each of which being produced by additively combining the signals from a group of q output lines; and
  (c) repeating steps a and b for other group of rows in the detector array;
where m, n, p and q are integers where both p and q are greater than one.

13. The method as recited in claim 12 wherein m equals n; and p equals q.

14. The method as recited in claim 12 wherein the first time that step (a) is executed the group of rows is proximate to the center of the array, and each time thereafter that step (a) is executed the group of rows is sequentially farther from the center of the array.

15. The method as recited in claim 12 wherein the first time that step (a) is executed the group of rows is proximate to the center of the array, and each time thereafter that step (a) is executed the rows in the group are from alternate sides of the center of the array.

16. An image detector system comprising:
  an array of photodetectors arranged in m columns and n rows with the photodetectors in each column being connected by a switch means to a separate output line for that column, wherein the n rows are divided into groups of p rows and the column output lines are divided into groups of q output lines, where m, n, p and q are integers with both p and q being greater than one;
  means for sequentially activating the switch means to simultaneously apply signals from the photodetectors in one group of rows at a time to the output lines;
  means for combining the signals from each group of output lines into a combined output signal.

17. The image detector system as recited in claim 16 wherein said means for combining comprises:
  separate means for integrating the signal on each column output line;
  means for selectively defining the number q of column output lines in each group;
  means, responsive to said means for defining, for adding the signals from those of said means for integrating associated with each group of q adjacent output lines to produce the combined output signals.

18. The image detector system as recited in claim 17 wherein said means for combining further comprises means for digitizing each of the combined output signals.

19. The image detector system as recited in claim 16 wherein said means for combining comprises:
  separate means for integrating the signal on each column output line;
  means for digitizing the integrated signals from each of said means for integrating;
  means for selectively defining the number q of column output lines in each group;
  means, responsive to said means for defining, for adding the signals from those of said means for digitizing the signals associated with each group of q adjacent output lines to produce the combined output signals.

* * * * *